UNITED STATES PATENT OFFICE.

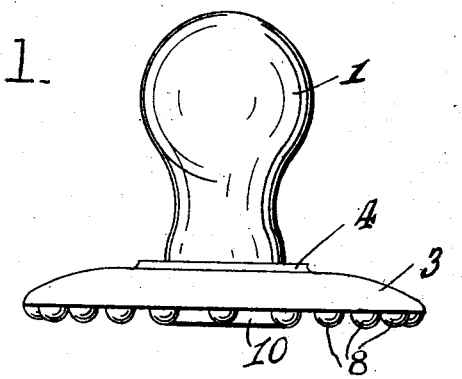
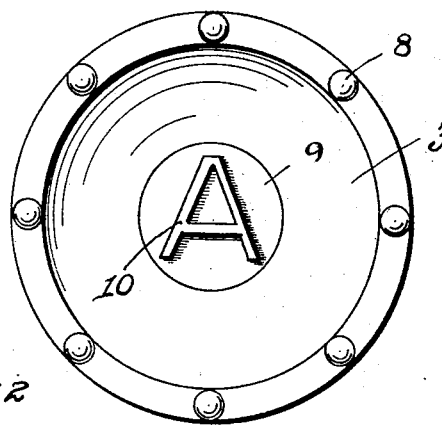
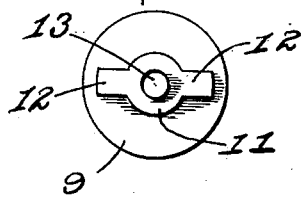
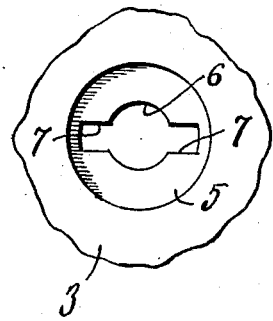
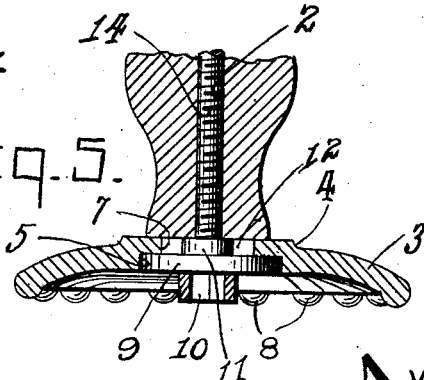

WILLIAM L. ANGEL, OF PORTLAND, OREGON.

PIE-STAMP.

1,189,032.　　　　　Specification of Letters Patent.　　Patented June 27, 1916.

Application filed September 23, 1913. Serial No. 791,440.

*To all whom it may concern:*

Be it known that I, WILLIAM L. ANGEL, a citizen of the United States, residing at Portland, in the county of Multnomah and State of Oregon, have invented certain new and useful Improvements in Pie-Stamps; and I do hereby declare the following to be a full, clear, and exact description of the invention, such as will enable others skilled in the art to which it appertains to make and use the same.

This invention relates to new and useful improvements in pie stamps and has for its object the provision of a device which will perforate the top crust of a pie and thereby provide for the escape of any steam which may have gathered therein.

Another object of my invention is the provision of such a device which will also stamp a pie and thereby indicate to the user the kind of fruit contained in the pie.

A further object of the invention is the provision of such a device wherein the characters used may be interchanged.

With the above and other objects in view I will now proceed to describe my invention in the following specification and accompanying drawings, in which, Figure 1 is a side view in elevation of my improved pie stamp, Fig. 2 is a bottom plan view of the same, Fig. 3 is a fragmental view of the bottom of the stamp showing the detailed construction of the slot, Fig. 4 is a top plan view of the letter carrying plate showing the stem secured thereto, and Fig. 5 is a longitudinal sectional view of the pie stamp.

Referring to the drawings by characters of reference 1 indicates the handle of my improved pie stamp which is enlarged at its upper extremity as clearly illustrated. This handle is provided with the longitudinally extending internally screw threaded aperture 2, which is adapted to receive the screw threaded shank of the die plate when the device is in use.

A suitable base plate 3 which is substantially concavo-convex in cross section is provided and has formed integrally therewith the central upstanding boss 4. This central boss 4 extends from the upper surface of the plate 3 and is adapted to form an abutment for the lower end of the handle 1 as will be clearly seen upon referring to Figs. 1 and 5. This base plate 3, as described above, is concave as shown in Fig. 5 and provided with the central circular recess 5, having centrally located therein the aperture 6. At diametrically opposite points in the recess I preferably provide the slots 7 which extend as shown in Fig. 3 nearly to the wall of the recess 5. Suitable dies 8 are formed integrally with the plate 3 at predetermined intervals around its periphery on its under face between its edge and the edge of the concavity before mentioned and are adapted to pierce the pie crust when the device is in use.

A die plate 9, having formed integrally with the lower surface thereof the letter or marking die 10, which is adapted to indicate the kind of pie, is provided and is adapted to rest in the recess 5, when the device is in use. Formed integrally with the upper surface of the plate 9 and centrally located with relation thereto I preferably provide the cylindrical portion 11 having extending outwardly therefrom at diametrically opposite points the extensions 12, which are adapted to fit the slots 7 formed in the plate 3. Centrally located with relation to the cylindrical portion 11 and formed integrally therewith I also provide a stem 13, having formed thereon throughout its entire length the screw threads 14 which are adapted to coöperate with the screw threads formed on the interior of the aperture 2.

It will be apparent from the foregoing that when it is desired to make use of my improved pie stamp the same is placed upon the pie at the desired point and a slight pressure downwardly will force the dies 8 through the crust, thereby piercing the same and providing an outlet for steam which, if confined would cause the crust to bulge and burn. Furthermore the letter which is held in the stamp will indicate to the consumer the kind of pie, thereby eliminating the danger of mistakes being made in the selection. Owing to the interchangeability of the letters it will be apparent that a single stamp provided with a series of letters of the alphabet may serve to mark any kind of pie and thereby eliminating the expense of providing a separate stamp for each individual pie.

While in the foregoing I have shown and described the preferred embodiment of my invention I wish it to be understood that I may change the specific arrangement and combination of parts without in any way departing from the spirit and scope of my invention as defined in the appended claim.

What is claimed is:—

A pie stamp of the class described comprising a concave base provided on the under surface of its periphery with a plurality of spaced beads, said base provided centrally with an upstanding boss having a central opening therethrough, said boss providing a central recess interiorly of the base, said recess being provided with slots at diametrically opposite points, a die having a letter formed on one face, a cylindrical portion formed on the opposite face of said die, stanchions formed on the upper face of said cylindrical portion at diametrically opposite points, a screw threaded stem rigidly secured centrally to the cylindrical portion, said stem being adapted to extend up through the central opening of the base and the stanchion of the die plate, fitting up into the slots of the base, and a handle secured to the upper portion of the stem to hold the die plate in position within the recess of the base when in use.

In testimony whereof I affix my signature in presence of two witnesses.

WILLIAM L. ANGEL.

Witnesses:
CHESTER A. WAGNER,
GEO. L. BOYNTON.

Copies of this patent may be obtained for five cents each, by addressing the "Commissioner of Patents, Washington, D. C."